United States Patent [19]

Groiss

[11] Patent Number: 5,652,480

[45] Date of Patent: Jul. 29, 1997

[54] ELECTRONIC BALLAST INCORPORATING A CLOCKED SWITCHING CONTROLLER

[75] Inventor: Stefan Groiss, Dornbirn, Austria

[73] Assignee: Tridonic Bauelemente GmbH, Dornbirn, Austria

[21] Appl. No.: 295,419

[22] Filed: Aug. 25, 1994

[30] Foreign Application Priority Data

Sep. 3, 1993 [DE] Germany ............... 43 29 821.4

[51] Int. Cl.⁶ ........................................... H05B 41/29
[52] U.S. Cl. ........................ 315/247; 315/219; 315/224; 363/37; 363/134; 363/40; 323/207; 323/222
[58] Field of Search ................ 315/219, 291, 315/224, 247, 209 R; 363/132, 16, 34, 37, 39, 40, 89, 97, 47, 134; 323/205, 207, 222

[56] References Cited

U.S. PATENT DOCUMENTS

| | | | |
|---|---|---|---|
| 4,251,752 | 2/1981 | Stolz | 315/206 |
| 4,523,131 | 6/1985 | Zansky | 315/307 |
| 5,049,790 | 9/1991 | Herfurth et al. | 315/291 |
| 5,224,025 | 6/1993 | Divan et al. | 363/16 |
| 5,359,278 | 10/1994 | Notohara et al. | 323/222 |
| 5,371,667 | 12/1994 | Nakao et al. | 363/124 |
| 5,406,192 | 4/1995 | Vinciarelli | 323/222 |
| 5,434,477 | 7/1995 | Crouse et al. | 315/209 R |

FOREIGN PATENT DOCUMENTS

| | | |
|---|---|---|
| 268043A1 | 5/1988 | European Pat. Off. . |
| 0435628 | 7/1991 | European Pat. Off. . |
| 0435628A3 | 7/1991 | European Pat. Off. . |
| 0487564 | 3/1992 | Japan ................... 363/89 |

OTHER PUBLICATIONS

"Betriebsgeräte und Schaltungen für Lampen", C.H. Sturm, et al., Siemens AG, 6th Edition, 1992, pp. 127–128.
"Halbleiteschaltungstechnick", U. Stietze, et al. Springer, 9th Edition, pp. 563–570.

*Primary Examiner*—Robert Pascal
*Assistant Examiner*—Arnold Kinkead
*Attorney, Agent, or Firm*—Fitzpatrick, Cella, Harper & Scinto

[57] ABSTRACT

There is provided an electronic ballast for supplying a load, for example a lamp, in particular a gas discharge lamp, with an a.c. voltage (Un) the frequency of which is higher than the mains frequency. The ballast has a rectifier (GL) to be connected to the a.c. mains, an inverter connected downstream thereof, having two switches (S2, S1), which inverter generates the higher frequency a.c. voltage for the load (Z), and an electronic harmonics filter arranged between the rectifier (GL) and the inverter, in the form of a clocked switching controller. The control switch (S1) of the clocked switching controller at the same time forms one of the two switches (S1) of the inverter.

12 Claims, 2 Drawing Sheets

ELECTRONIC BALLAST INCORPORATING A CLOCKED SWITCHING CONTROLLER

BACKGROUND OF THE INVENTION

1. Field of the Invention

The invention relates to an electronic ballast for supplying a load, for example a lamp, in particular a gas discharge lamp, with an a.c. voltage the frequency of which is higher than the mains frequency, having a rectifier to be connected to the a.c. mains, an inverter comprising two switches connected downstream of the rectifier, which inverter generates the higher frequency a.c. voltage for the load, and a harmonics filter arranged between the rectifier and the inverter, in the form of a clocked switching controller.

In particular the invention relates to an electronic ballast, the electronic harmonics filter of which consists of a clocked switching controller in the form of an inverting transformer (inverse transformer).

2. Description of the Related Art

Gas discharge lamps have an unsatisfactory light efficiency and tend to flicker when operated with mains frequency. For this reason they are usually operated with electronic ballasts which work at mains voltage and generate a higher frequency operating voltage for the gas discharge lamps therefrom, the frequency of which lies in the region from 20 to 50 kHz. The electronic ballasts have a rectifier, which rectifies the mains voltage and an inverter, which generates the higher frequency operating voltage from the rectified mains voltage. Through the utilization of electronic ballasts the light efficiency of the gas discharge lamps may be considerably increased and flickering may be avoided. At the same time, however, the problem occurs that as a result of the rectification harmonic waves result which cause unacceptable disturbances when fed back into the mains. To avoid this, a passive filter can be connected to the rectifier and the mains which filter must however comprise a relatively large and expensive choke. This choke can be avoided if an electronic harmonics filter is connected between rectifier and inverter instead of the passive filter. The electronic harmonics filter, which is usually constructed in the form of a clocked switching controller, manifests itself in that it removes pulse-like current from the rectifier, whereby the envelope curve of the current pulses is approximated to a sinusoidal half-wave form with mains frequency.

Such a harmonics filter is described for example in EP 268 043 A1 or in the book by C. H. STURM/E. KLEIN, "Betriebsgeräte und Schaltungen für Lampen" ("Operating devices and circuits for lamps"), Publisher Siemens AG, 6th Edition, 1992, pages 127/128. The electronic harmonics filter consists of a clocked switching controller; which can for example be a step-up transformer (booster) or an inverting transformer. The principle of such a clocked switching controller is also described in the book by U. STIETZE, CH. SCHENK, "Halbleiterschaltungstechnik" ("Semiconductor circuitry techniques"), Publisher Springer, 9th Edition, pp. 563 to 570. With the known harmonics filter the output voltage of the switching controller is constantly monitored and compared with a fixed desired-value voltage. From the control difference, the controller generates a control signal of variable switching frequency for the switch of the switching controller.

The combination of the known component circuits provides for the electronic ballast a circuitry configuration consisting, in terms of function, of a rectifier, an electronic harmonics filter and an inverter. Hereby an electronic harmonics filter structured in such a way proves to be, in terms of circuitry configuration, too complicated and to result in unacceptable manufacturing costs, in particular when used for individual lamps.

There were therefore suggested electronic ballasts with harmonics filters in the form of step-up transformers (boosters) in which the control switch of the clocked switching controller forms at the same time one of the two inverter switches. Such circuits are known for example from U.S. Pat. No. 5,224,025 or EP-A-0 435 628.

SUMMARY OF THE INVENTION

It is the object of the invention to so modify an electronic ballast of the kind mentioned in the introduction, having a harmonics filter connected between the rectifier and the inverter, which filter is in particular configured in the form of an inverting transformer (inverse transformer), that it may be manufactured with reduced circuitry outlay.

The object according to the invention is achieved in that the control switch of the clocked switching controller, formed as an inverting transformer (inverse transformer); at the same time forms one of the two switches of the inverter. As known per se, the switching controller formed as an inverting transformer (inverse transformer) has a first impedance in the form of a coil and a control switch, which form a series circuit connected in parallel to the rectifier, and whereby a second impedance is connected in parallel with the first impedance, which second impedance is decoupled from the rectifier by means of at least one diode. Whenever the control switch is opened, the energy stored in the first impedance with the control switch closed is transferred to the second impedance. Therewith a load can be operated at the second impedance via an inverter, whereby one of the current paths of the usual inverter can be provided via the control switch of the harmonics filter. In this way not only the second switch for the inverter is saved, but also the driver circuitry required therefor, whereby the electronic ballast can be manufactured more compactly and more economically.

According to a preferred embodiment of the invention the other of the two inverter switches is connected in parallel to the second impedance.

Further advantageous developments of the invention are set out in the subsidiary claims.

BRIEF DESCRIPTION OF THE DRAWINGS

The invention will be now be described in detail with reference to exemplary embodiments and with reference to the drawings, which show.

DETAILED DESCRIPTION OF THE PREFERRED EMBODIMENTS

Figure 1:
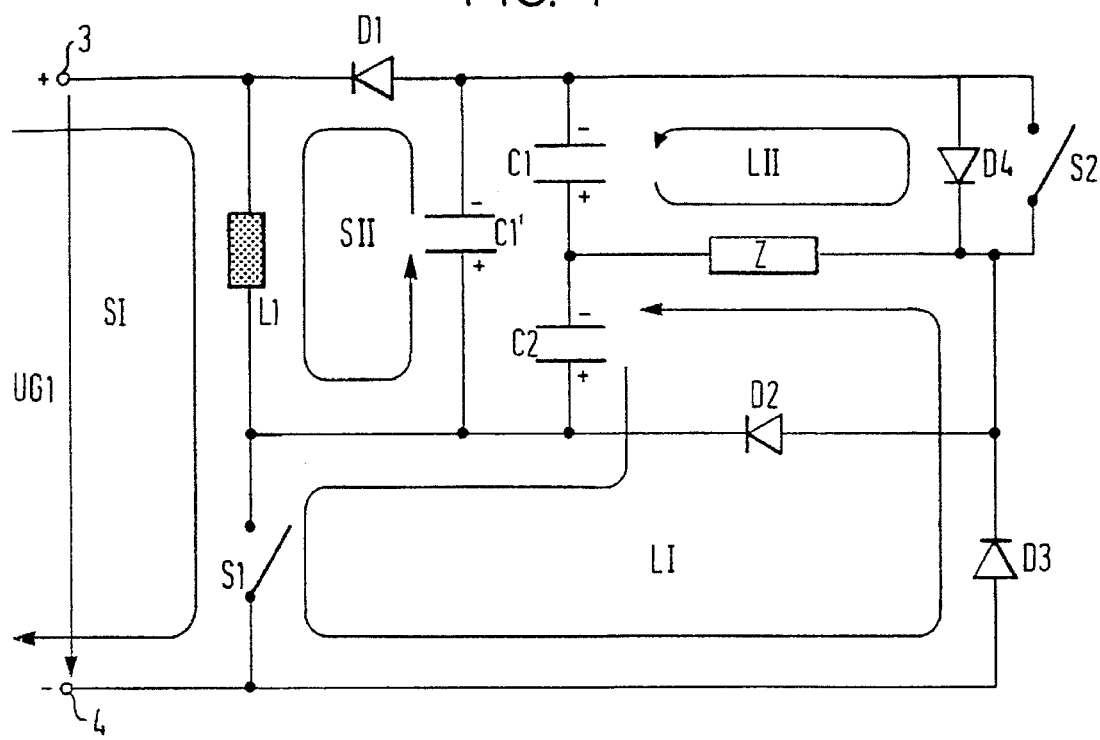
FIG. 1 a first exemplary embodiment for the illustration of functional principles, FIG. 2 a second, further simplified exemplary embodiment, with reversed polarity in comparison to FIG. 1 and FIG. 3 a further exemplary embodiment for use for gas discharge lamps.

In the first exemplary embodiment, which is illustrated in FIG. 1, a series circuit of the coil L1 and the switch S1 is connected to a d.c. voltage source (not shown) at the terminals 3 and 4. As soon as the switch S1 is closed, a current flows through the coil L1. There thus results a current flow which is designated with SL. Parallel to the coil L1 there is connected a series circuit which is formed by a diode D1 and a capacitor C1'. The diode is poled in such a way that it blocks the d.c. voltage UG1 present at the points 3 and 4. As soon as the switch S1 opens, a voltage at the coil L1 falls, in accordance with the equation: $U(t)=-L \cdot di/dt$, which has a polarity opposite to that of the voltage at the points 3 and 4. On account of the coil voltage the electric energy stored in the coil with the switch S1 closed is now transferred to the capacitor C1' via the diode D1, whereby the voltage at the capacitor C1' has a reversed polarity as compared to the d.c. voltage UG1. In parallel with the capacitor C1' there is connected a series circuit of two capacitors C1 and C2, which are of the same size and therefore symmetrically divide the voltage at the capacitor C1'. At the nodal point connecting the capacitors C1 and C2 a terminal of a load Z is connected. At the other end of the load Z a switch S2 is connected, the other terminal of which is connected to that side of the capacitor C1' which is connected with the diode D1. The switch S2 has the function of one of two switches of an inverter, whilst the switch S1 assumes the function of the second switch of the inverter. If the capacitors C1 and C2 or C1' are charged, the switch S2 can be closed, whereby the capacitor C1 discharges via the load Z and forms a current flow which is designated with LII. If the switch S2 opens, the switch S1 is closed, so that the capacitor C2 discharges via the load Z, a diode D3 and the switch S1. The diode D3 is connected with the load Z and the terminal 4 and is poled in such a way that it blocks the voltage present at the terminal 4 with the switch S2 closed in the direction towards the nodal point connecting the diode D1 and the capacitor C1', yet allows the flow of a load current, which load current is designated with LI. The switch S1 thus carries at the same time the current which provides for the storage of energy in the coil L1, and the load current LI. When the switch S1 is opened and the switch S2 is closed, the charging of the capacitors C1', C1 and C2 and the operation with the load current LII occur at the same time. The diodes D4 and D2 shown in FIG. 1 form respective freewheeling diodes for the switches S2 and S1, which protect the switches from overvoltage with the wrong polarity, in a way which is known per se, if these switches are for example semiconductor switching transistors.

Figure 2:
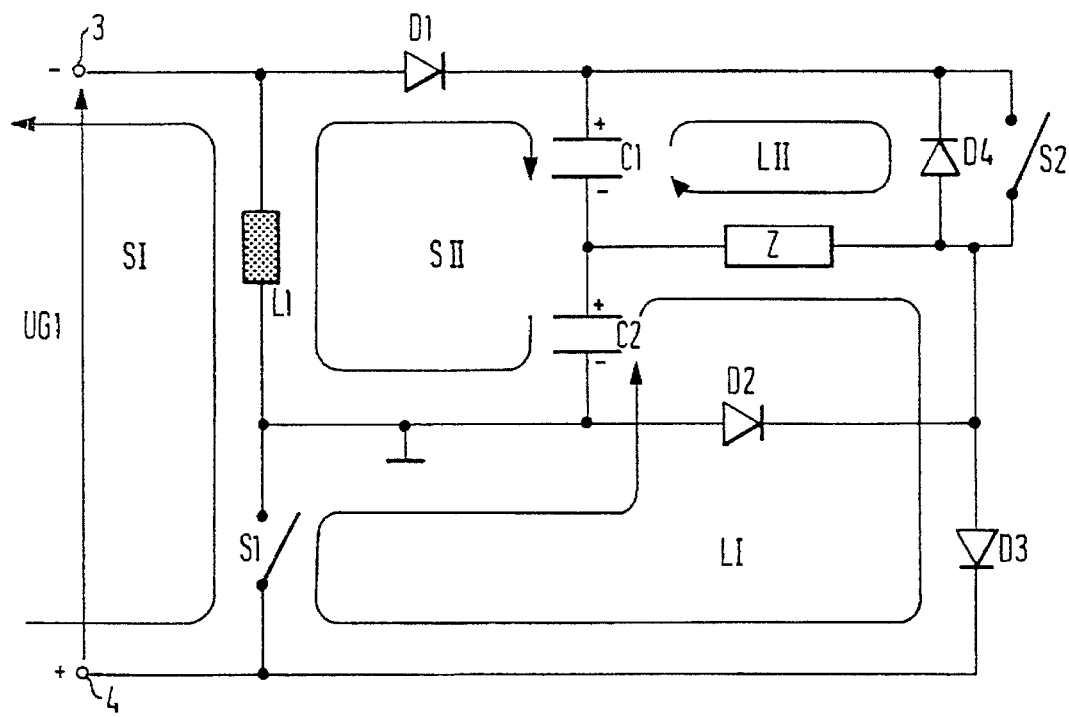

FIG. 2 shows an exemplary embodiment, which largely corresponds with the exemplary embodiment shown in FIG. 1. The difference is that the polarity of the d.c. voltage connected to the terminals 3 and 4 is reversed as compared to FIG. 1. Thus, at the same time there results a reversed poling of the diodes D1 to D4. The arrangement illustrated in FIG. 1, consisting of the capacitors C1', C1 and C2 can, as illustrated in FIG. 2, be replaced by two capacitors C1 and C2 whereby these then—with appropriate dimensioning— take over the energy-storing function of the capacitor C1' according to FIG. 1. Apart from saving a capacitor, the exemplary embodiment illustrated in FIG. 2 is further advantageous in that at the nodal point connecting the coil L1, the switch S1 and the capacitor C2, an earthing point is formed which is also suitable for a control circuit (not shown) for controlling the switches S1 and S2.

Figure 3:
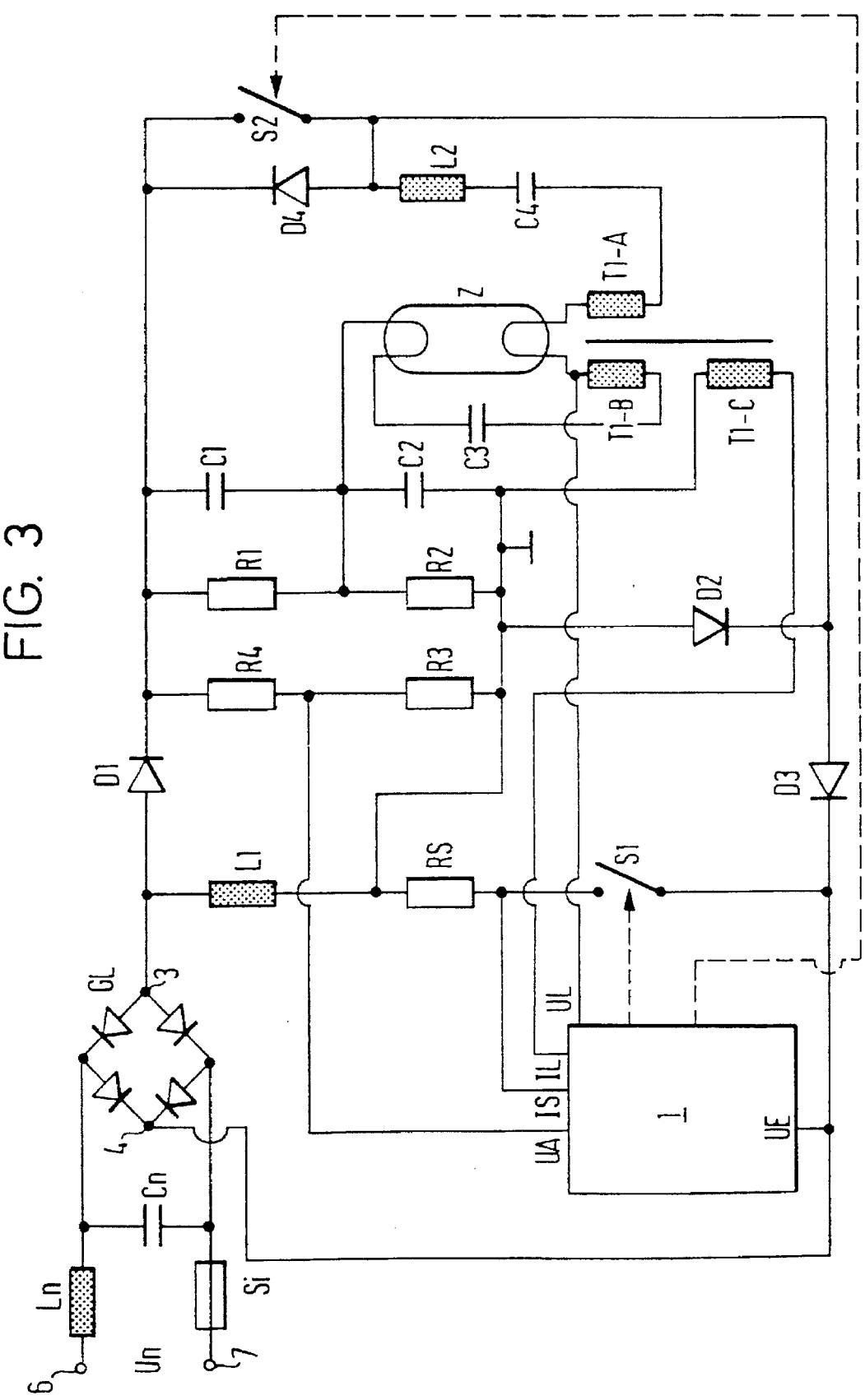

FIG. 3 shows an exemplary embodiment which is similar to that shown in FIG. 2, whereby it is adapted for use in an electronic ballast for gas discharge lamps. At the terminals 3 and 4 a bridge rectifier is connected which rectifies an a.c. mains voltage Un at the terminals 6 and 7. A coil Ln and a capacitor Cn are provided as a mains filter. Further there is a safety-fuse Si also provided at the terminal 7. Therefore, there is provided at the terminals 3 and 4 a d.c. voltage pulsing at mains frequency. In this exemplary embodiment the load Z shown in FIGS. 1 and 2 is replaced by a gas discharge lamp, whereby the coil L2 and the capacitor C3 form the oscillation circuit necessary for the operation of gas discharge lamps. The capacitor C3 carries the pre-heating current flowing through the heating coil of the gas discharge lamp, whereby a transformer T having three coils is connected in such a way that the magnetomotive force which is generated by the heating current eliminates itself and only the magnetomotive force resulting from the lamp current remains effective. Consequently a current which is proportional to the lamp current IL flows in the coil T1-C and a corresponding voltage value can be taken at the coil T1-C. This voltage value is fed as a parameter IL to a central control circuit 1 provided for the control of the switches S1 and S2. At the same time, the lamp voltage is fed to the control circuit 1 as parameter UL, the voltage at the points 3 and 4 is fed as parameter UE, the voltage dropped by the resistor RS is fed as parameter Is, which corresponds to the current through the switch S1, and the output voltage which is dropped over the series connection of the two capacitors C1 and C2 is fed as parameter UA. Hereby the voltage UA is transformed into a value range which is suitable for the central control circuit by means of a voltage divider which consists of the series connection of the resistors R4 and R3. In this way all parameters can be detected which are required for the switching of switch S1 and switch S2 in such a way that, in dependence upon the operating state of the lamp, the pulse current loading the rectifier GL always has the envelope curve of a sinusoidal half wave.

At the same time the parameters serve for monitoring the switching operation secured, so that faulty operation can be recognised quickly.

Apart from the use for gas discharge lamps, the circuits according to FIGS. 1 and 2 can also be used for the operation of low voltage halogen lamps. Hereby, the primary side of a transformer generally used for the operation of low voltage halogen lamps is employed in place of the load Z.

I claim:

1. An electronic ballast for supplying a load with an a.c. voltage, which has a frequency which is higher than a mains frequency, said ballast comprising:

a rectifier arranged to be connected to an a.c. mains, an inverter connected downstream of the rectifier, said inverter including two control switches, and being arranged to generate a high frequency a.c. voltage for a load, and an electronics harmonics filter arranged between the rectifier, and the inverter, said harmonics filter being in the form of a clocked switching controller, said switching controller including a first impedance element and a first of two control switches connected in series across the output of said rectifier, said switching controller further including a series connection of a first diode and a second impedance arrangement, said series connection being connected across the first impedance element characterised in that said first of two control switches of the clocked switching controller at the same time comprises one of the two control switches of the inverter, and in that the other of the two control switches of the inverter and a load are connected in series across a part of the second impedance arrangement.

2. An electronic ballast according to claim 1, characterised in that, the second impedance arrangement is formed by two part impedances connected in series, in that, the load is connected with the connection point of the two part impedances on the one hand and on the other hand is connected via a second diode with the terminal of the control switch which is connected with the first impedance element, and is further connected via a third diode with the terminal of the control switch away from the first impedance element, and in that, the other of two control switches of the inverter is bridged by a fourth diode, whereby the polarities of the first and the third diode are so chosen that the second impedance is, in terms of d.c. current, decoupled from the rectifier, and the polarities of the second and the fourth diode, are so chosen that they form respective freewheeling diodes for the two control switches.

3. An electronic ballast according to claim 2, characterised in that, the part impedances of the second impedance are formed with capacitors.

4. An electronic ballast according to claim 3, characterised in that, a single capacitor is connected in parallel with the series connection of two part impedances formed with capacitors.

5. An electronic ballast according to claim 3, characterised in that, a respective resistor is connected in parallel with each of the two capacitors, whereby the resistors divide the voltage across the second impedance between the capacitors which form the part impedances, and these discharge when the ballast is switched off.

6. An electronic ballast according to claim 1, characterised in that, a central control circuit is provided which, on the basis of supplied control parameters, issues control signals for the control switches of the inverter.

7. An electronic ballast according to claim 6, characterised in that, one of the control parameters is the input voltage delivered by the rectifier.

8. An electronic ballast according to claim 6, characterised in that, one of the control parameters is the current through the control switch, which is detected by means of a measurement resistor.

9. An electronic ballast according to claim 6, characterised in that, one of the control parameters is the output voltage of the switching controller, which is converted into a voltage range which is suitable for the central control circuit by means of a voltage divider.

10. An electronic ballast according to claim 9, characterised in that, the voltage divider is an ohmic voltage divider.

11. An electronic ballast according to claim 6, characterised in that, one of the control parameters is the load current, which is detected by means of an inductive pick-up.

12. An electronic ballast according to claim 6, characterised in that, one of the control parameters is the voltage across the load.

* * * * *